United States Patent
Abebe et al.

(10) Patent No.: US 10,205,794 B2
(45) Date of Patent: Feb. 12, 2019

(54) ENHANCING DIGITAL MEDIA WITH SUPPLEMENTAL CONTEXTUALLY RELEVANT CONTENT

(71) Applicant: International Business Machines Corporation, Armonk, NY (US)

(72) Inventors: Ermyas Abebe, Carlton (AU); Peter Ilfrich, Kensington (AU); Cristian Vecchiola, Carlton (AU)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 15/259,399

(22) Filed: Sep. 8, 2016

(65) Prior Publication Data
US 2018/0069914 A1    Mar. 8, 2018

(51) Int. Cl.
| | |
|---|---|
| *G06F 15/16* | (2006.01) |
| *H04L 29/08* | (2006.01) |
| *H04L 29/06* | (2006.01) |
| *H04N 21/00* | (2011.01) |
| *G06F 17/30* | (2006.01) |

(52) U.S. Cl.
CPC .......... *H04L 67/2804* (2013.01); *H04L 65/00* (2013.01); *H04N 21/00* (2013.01); *G06F 17/30796* (2013.01)

(58) Field of Classification Search
CPC ..... H04L 67/02; H04L 67/06; H04L 67/2804; H04L 65/00; H04N 21/00; G06F 17/30796
See application file for complete search history.

(56) References Cited

U.S. PATENT DOCUMENTS

| | | | |
|---|---|---|---|
| 6,209,028 B1 * | 3/2001 | Walker | H04N 7/17318 348/E7.071 |
| 8,526,782 B2 | 9/2013 | Kaiser et al. | |
| 9,213,705 B1 * | 12/2015 | Story, Jr. | G06F 17/30056 |
| 9,760,778 B1 * | 9/2017 | Wakim | G06K 9/00711 |
| 2007/0250901 A1 * | 10/2007 | McIntire | H04N 7/17318 725/146 |
| 2010/0240455 A1 | 9/2010 | Gagner et al. | |
| 2011/0246495 A1 * | 10/2011 | Mallinson | G06F 17/30026 707/758 |
| 2013/0322765 A1 * | 12/2013 | Neumann | G06K 9/00765 382/197 |
| 2014/0089423 A1 * | 3/2014 | Jackels | H04N 21/4788 709/206 |
| 2015/0341694 A1 * | 11/2015 | Hanko | H04N 21/435 725/32 |
| 2016/0119691 A1 * | 4/2016 | Accardo | H04N 21/233 725/18 |
| 2017/0223109 A1 * | 8/2017 | Shoemake | H04W 76/10 |
| 2017/0347162 A1 * | 11/2017 | Lin | H04N 21/8133 |
| 2018/0063572 A1 * | 3/2018 | Smus | H04N 21/4307 |

* cited by examiner

*Primary Examiner* — Jonathan A Bui
(74) *Attorney, Agent, or Firm* — David Quinn

(57) ABSTRACT

A computer-implemented method includes detecting a name occurring in a component of a media playing on a first user endpoint device. The component is contained within an electronic signal. An entity in the media that is associated with the name is identified, and stored data that is contextually related to the entity is retrieved. The data is then formatted as supplemental content for display to a user of the first user endpoint device.

25 Claims, 5 Drawing Sheets

US 10,205,794 B2

ENHANCING DIGITAL MEDIA WITH SUPPLEMENTAL CONTEXTUALLY RELEVANT CONTENT

BACKGROUND OF THE INVENTION

Various forms of digital entertainment media, including television shows, film franchises, web series, podcasts, audio-books, electronic books, and the like, introduce numerous characters, objects, and locations over the course of multiple installments. These characters, objects, and locations often function as important story elements, making a detailed understanding of their identities, roles, and relationships part of an immersive experience.

SUMMARY OF THE INVENTION

A computer-implemented method includes detecting a name occurring in a component of a media playing on a first user endpoint device. The component is contained within an electronic signal. An entity in the media that is associated with the name is identified, and stored data that is contextually related to the entity is retrieved. The data is then formatted as supplemental content for display to a user of the first user endpoint device.

In another example, a machine-readable storage medium is encoded with instructions executable by a processor. The instructions include instructions to detect a name occurring in a component of a media playing on a first user endpoint device. The component is contained within an electronic signal. The instructions further include instructions to identify an entity in the media that is associated with the name, and to retrieve stored data that is contextually related to the entity. The instructions further include instructions to format the data as supplemental content for display to a user of the first user endpoint device.

In another example, an apparatus includes a hardware processor element and a plurality of programming code components that, when executed by the hardware processor element, cause the hardware processor element to perform operations. The operations include detecting a name occurring in a component of a media playing on a first user endpoint device, where the component is contained within an electronic signal. The operations further include identifying an entity in the media that is associated with the name and retrieving stored data that is contextually related to the entity. The operations further include formatting the data as supplemental content for display to a user of the first user endpoint device.

In another example, a computer-implemented method includes obtaining an electronic signal containing an audio component recorded from a media playing on a first user endpoint device. The media is identified. A text transcription of the audio component of the media is generated, and a name is detected in the text transcription. An entity in the media that is associated with the name is identified, and stored data that is contextually related to the entity is retrieved. The data is formatted as supplemental content for display to a user of the first user endpoint device.

In another example, a computer-implemented method includes obtaining an electronic signal containing a text file corresponding to dialogue from a media playing on a first user endpoint device. The media is identified. A name is detected in the text file, and an entity in the media that is associated with the name is identified. Stored data that is contextually related to the entity is retrieved, and the data is formatted as supplemental content for display to a user of the first user endpoint device.

BRIEF DESCRIPTION OF THE DRAWINGS

So that the manner in which the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In one example, a method, machine readable storage medium, and apparatus for enhancing digital media with supplemental contextually relevant content is disclosed. As discussed above, various forms of digital entertainment media, including television shows, film franchises, web series, podcasts, audio-books, electronic books, and the like, introduce numerous characters, objects, and locations over the course of multiple installments. These characters, objects, and locations often function as important story elements, making a detailed understanding of their identities, roles, and relationships part of an immersive experience. However, because the installments of the entertainment media may be provided over an extended period of time, with days, weeks, months, or even years elapsing between one installment and the next, it may be difficult for the audience to recall these details for some characters, objects, or locations. For instance, when viewing an episode of a television show after a few months' hiatus, a viewer may have a hard time recalling the identity of a particular character depicted onscreen. This may not only detract from the viewing experience, but may also cause the viewer to become distracted and disengaged from the story.

Examples of the disclosure analyze components of digital entertainment media in order to automatically identify entities (e.g., characters, objects, and locations) depicted therein, and then provide a user with contextually relevant supplemental content about a character, object, or location in a timely manner (e.g., such that the user has the option of reviewing the supplemental content while experiencing the entertainment media). For instance, the user may have the option of viewing the supplemental content immediately (e.g., as an overlay superimposed directly over the entertainment media) or at a later time (e.g., on a computing device that is separate from the device used to play the entertainment media).

Figure 1:
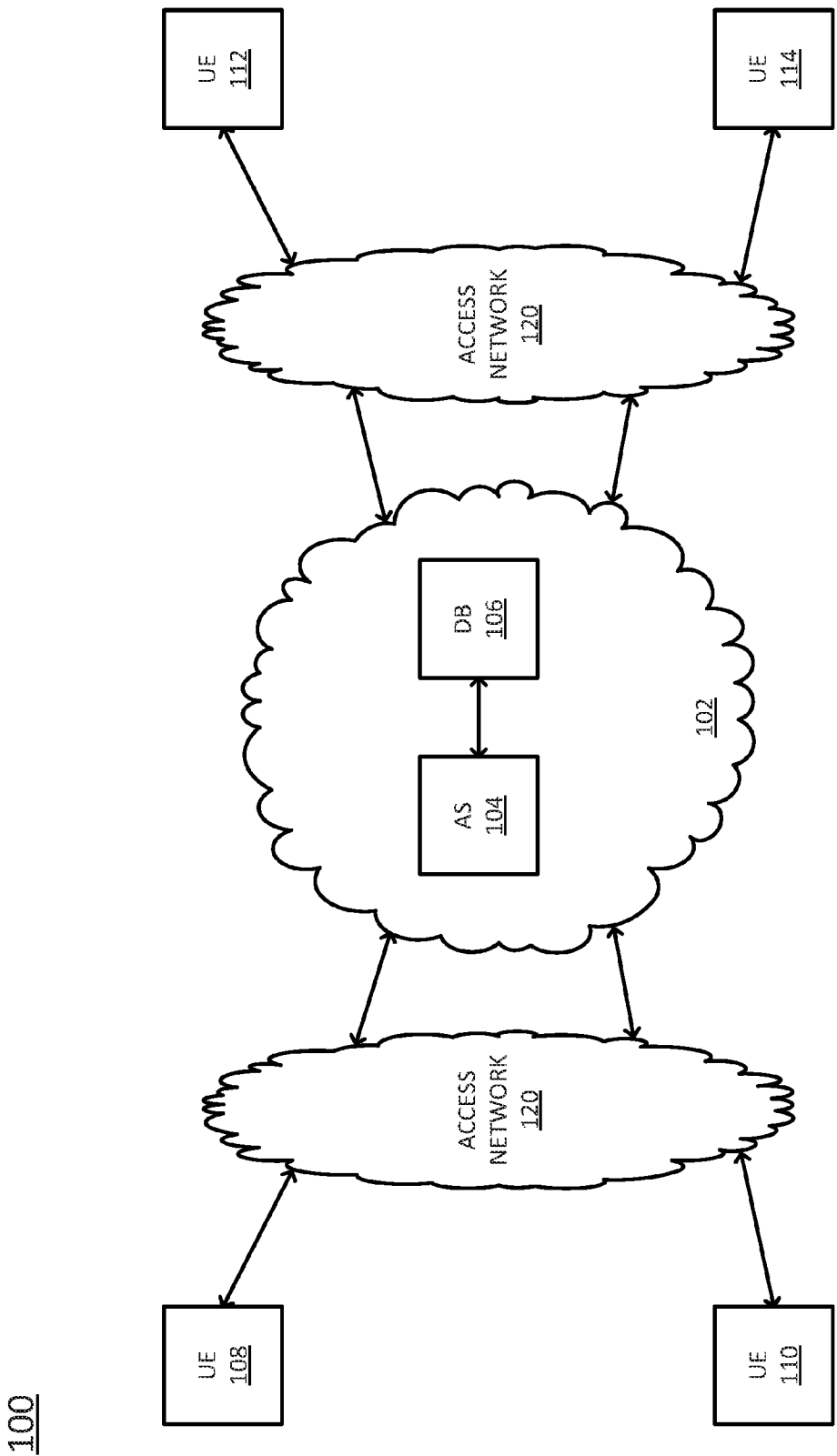
FIG. 1 depicts a high level block diagram illustrating one example of a communications network.

FIG. 1 depicts a high level block diagram illustrating one example of a communications network 100. The communications network 100 may be any type of communications network, such as for example, a traditional circuit switched or content distribution network (e.g., a public switched telephone network (PSTN)) or an Internet Protocol (IP) network (e.g., an IP Multimedia Subsystem (IMS) network, an asynchronous transfer mode (ATM) network, a wireless network, a cellular network (e.g., 2G, 3G and the like), a long term evolution (LTE) network, and the like) related to the current disclosure. It should be noted that an IP network is broadly defined as a network that uses Internet Protocol to exchange data packets. Additional illustrative IP networks include Voice over IP (VoIP) networks, Service over IP (SoIP) networks, and the like.

In one example, the network 100 may comprise a core network 102. The core network 102 may be in communication with one or more access networks 120 and 122. The access networks 120 and 122 may include a wireless access network (e.g., a WiFi network and the like), a mobile or cellular access network, a PSTN access network, a cable access network, a wired access network and the like. In one example, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one example, the core network 102 may include an application server (AS) 104 and a database (DB) 106. Although only a single AS 104 and a single DB 106 are illustrated, it should be noted that any number of application servers 104 or databases 106 may be deployed.

Figure 2:
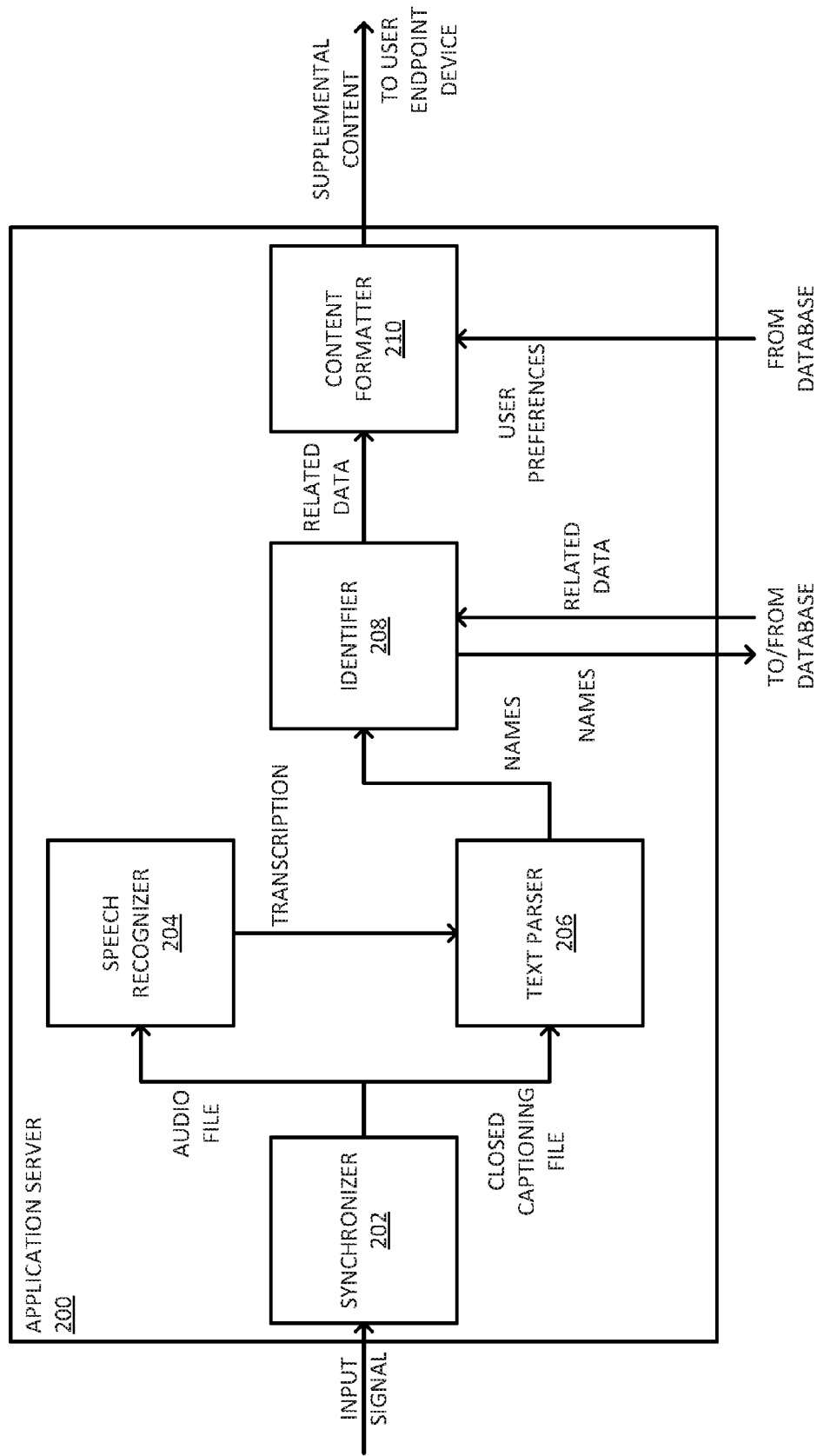
FIG. 2 depicts a high level block diagram illustrating one example of an application server of the present disclosure.

In one example, the AS 104 may host an application for enhancing digital entertainment media with supplemental contextually relevant content. As discussed in greater detail below, the AS 104 may exchange data with a user endpoint (UE) device and/or with the DB 106 in order to analyze entertainment media, identify characters, objects, or locations in the entertainment media, and retrieve and display contextually related supplemental content. The AS 104 may be configured as illustrated in FIG. 2 and described in greater detail below.

In one example, the DB 106 stores and indexes data related to entertainment media, such as information about titles, characters, objects, locations, plots, dialogue, trivia, and other metadata. The DB 106 may be a proprietary database or a third-party database such as the Internet Movie Database, Gracenote, Wikipedia, or the like. In a further example, the DB 106 may store user preferences for users of the AS 104. These preferences may include, for example, when and how specific users wish to receive supplemental content (e.g., during broadcast of the entertainment media versus after broadcast, displayed on the same user endpoint device as the entertainment media versus displayed on a separate user endpoint device, etc.).

In one example, the access networks 120 and 122 may be in communication with one or more user endpoint devices (also referred to as "endpoint devices" or "UE") 108, 110, 112, and 114. In one example, the user endpoint devices 108, 110, 112 and 114 may be any type of endpoint device such as a desktop computer or smart television or a mobile endpoint device such as a cellular telephone, a smart phone, a tablet computer, a laptop computer, a netbook, an ultrabook, a portable media device (e.g., an MP3 player), a gaming console, a portable gaming device, a set top box, microconsole, a digital media player, and the like, or even a wearable device such as a smart watch. Any of the user endpoint devices 108, 110, 112, and 114 may be configured as a computer similar to that illustrated in FIG. 3 and described in greater detail below. In one example, one or more of the UEs 108, 110, 112, or 114 may be configured to host an application for enhancing digital entertainment media with supplemental contextually relevant content. In this case, the UE may be able to perform some or all of the functions performed by the AS 104. Thus, the UE could bypass the AS 104 and interact directly with the DB 106 as necessary.

It should also be noted that the network 100 has been simplified. For example, the network 100 may include other network elements (not shown) such as border elements, routers, switches, policy servers, security devices, firewalls, a content distribution network (CDN) and the like.

FIG. 2 depicts a high level block diagram illustrating one example of an application server 200 of the present disclosure. The application server 200 may be deployed as the application server (AS) 104 of FIG. 1. Thus, the application server 200 is configured to host an application for enhancing digital entertainment media with supplemental contextually relevant content. Non-limiting reference may be made in the discussion of the application server 200 to various components of FIG. 1.

The application server 200 generally comprises a synchronizer 202, a speech recognizer 204, a text parser 206, an identifier 208, and a content formatter 210.

The synchronizer 202 receives an input signal from a user endpoint device, such as one of the UEs 108, 110, 112, or 114 illustrated in FIG. 1. In one example, the input signal is an electronic signal received over a content distribution network, such as the core network 102, and potentially may traverse one or more access networks such as the access network 120. The user endpoint device may be any type of endpoint device such as a desktop computer or smart television or a mobile endpoint device such as a cellular telephone, a smart phone, a tablet computer, a laptop computer, a netbook, an ultrabook, a portable media device (e.g., an MP3 player), a gaming console, a portable gaming device, a set top box, a microconsole, a digital media player, and the like, or even a wearable device such as a smart watch. The contents of the input signal may include content of a digital entertainment media. The entertainment media may be an episode of a television show, a film, an episode of a web series, an episode of a podcast, an audiobook, a digital book, or the like. Thus, the contents of the input signal may include an audio signal recorded from a broadcast of the entertainment media, a closed captioning or subtitle file associated with the entertainment media, or other data that is obtainable directly from the entertainment media. Alternatively, the contents of the input signal may include an indication from a user identifying the entertainment media (e.g., by show title, episode title or number, or the like).

The synchronizer 202 uses the information contained in the input signal to identify the entertainment media that the user is currently playing (e.g., watching, reading, or listening to). In a further example, the synchronizer 202 may use the information contained in the input signal to synchronize the application server 200 to the entertainment media (e.g., to identify the point in time in the entertainment media that is currently playing).

The synchronizer 202 may forward contents of the input signal to one or both of the speech recognizer 204 and the text parser 206. To this end, the synchronizer 202 may comprise a splitter or demultiplexer. For instance, if the input signal contains an audio signal recorded from a television broadcast, the synchronizer 202 may forward the audio signal to the speech recognizer 204 for further processing. The speech recognizer 204 performs one or more speech recognition techniques (e.g., automatic speech recognition, natural language processing, etc.) on the audio signal in order to recognize the words contained in the audio signal. To this end, the speech recognizer 204 may be programmed to recognize speech in one or more languages. The speech recognizer 204 may further include speech-to-text capabilities for producing a text transcription of the audio signal. This text transcription may be forwarded to the text parser 206.

The text parser 206 may receive the transcription of the audio signal from the speech recognizer 204, or may receive the closed captioning or subtitle file from the synchronizer 202 where the closed captioning or subtitle file was contained in the input signal. The text parser 206 parses the text transcription, closed captioning file, or subtitle file in order to detect names (e.g., of characters, objects, or locations) occurring therein. In one example, the text parser 206 may simply search for proper names. In a further example, the search may be narrowed to specific proper names based on metadata related to the entertainment media. For instance, once the synchronizer 202 has identified the entertainment media, the text parser 206 may be able to retrieve (e.g., from a database such as the DB 106) a list of character, object, and location names associated with the entertainment media. Thus, the search could be limited to names appearing in this list.

The identifier 208 receives the names that are detected by the text parser 206. The identifier 208 cross references these names with information about the entertainment media, which may be contained in a database such as the DB 106, in order to detect related data. For instance, the identifier 208 may compare a person's name detected by the text parser 206 to casting information or episode summaries for the entertainment media in order to identify a character appearing in the entertainment media.

The identifier 208 may forward any data it locates that is related to the names detected by the text parser 206 to the content formatter 210. The content formatter 210 will format the related data into supplemental content for delivery to the user. The supplemental content may include, for example, one or more images of a character, object, or location and text describing the character's, object's, or location's role and relationships in the entertainment media. In one example, the supplemental content may be formatted to satisfy one or more user preferences, which the content formatter 210 may obtain from a database (such as the DB 106). For instance, depending on user preference, the supplemental content may be arranged as an overlay to be superimposed directly over all or part of the entertainment media on a user endpoint device used for viewing (e.g., an overlay to be displayed on a television screen) or as a file that is formatted for viewing on a mobile device with a relatively small display (e.g., a smart phone). The content formatter 210 is configured to output the supplemental content to one or more user endpoint devices via a content distribution network, such as the core network 102 and/or access network 120.

Figure 3:
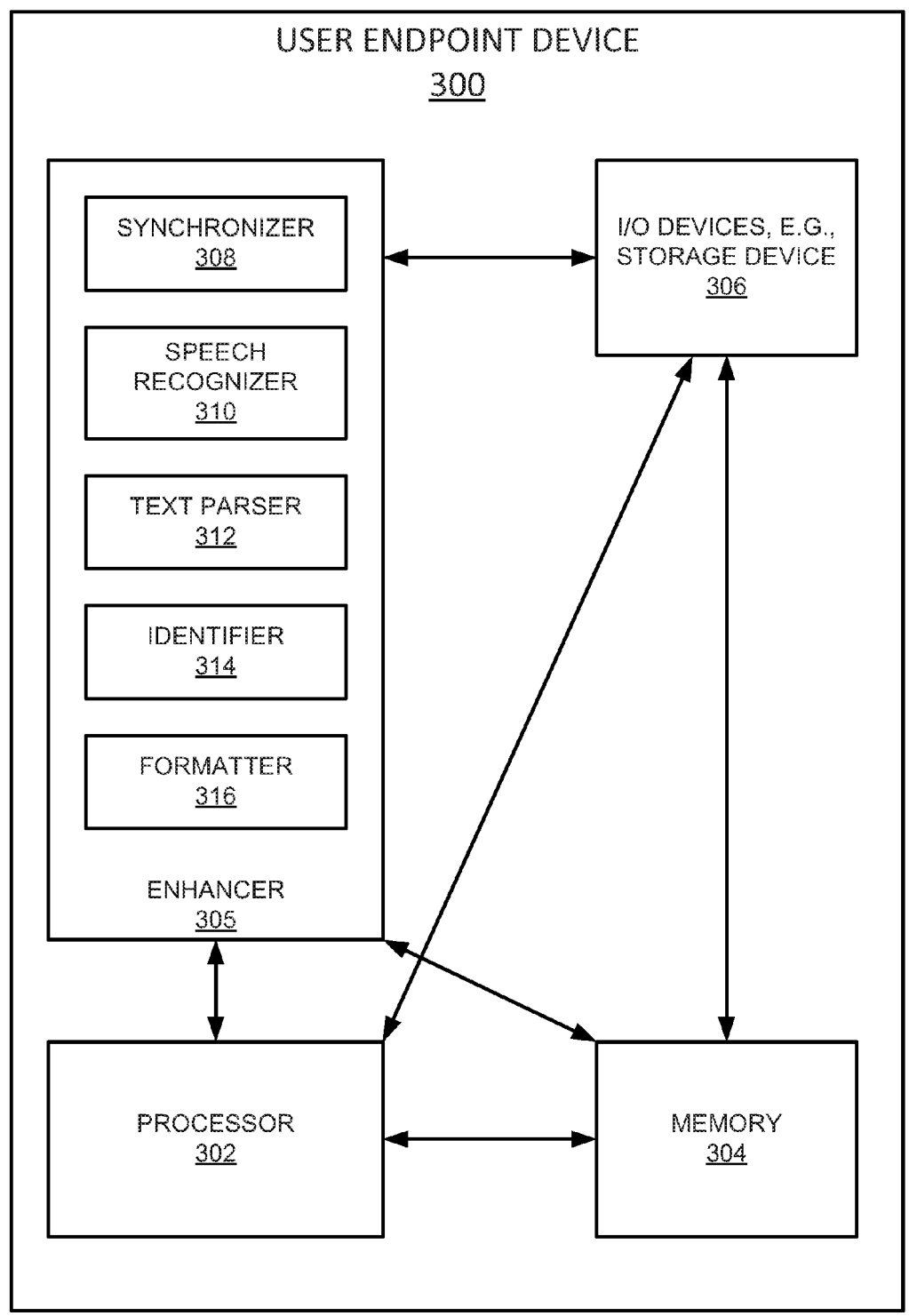
FIG. 3 depicts a high-level block diagram of an example user endpoint device of the present disclosure.

FIG. 3 depicts a high-level block diagram of an example user endpoint device 300 of the present disclosure. The user endpoint device 300 may be deployed as one of the UEs 108, 110, 112, or 114 of FIG. 1. In one example, the user endpoint device 300 is configured to host an application for enhancing digital entertainment media with supplemental contextually relevant content. Notably, no computer or machine currently exists that performs the functions as described herein. As a result, the examples of the present disclosure improve the operation and functioning of the user endpoint device 300 to enhance digital entertainment media with supplemental contextually relevant content, as disclosed herein.

The user endpoint device 300 may be part of a desktop computer or smart television or a mobile endpoint device such as a cellular telephone, a smart phone, a tablet computer, a laptop computer, a netbook, an ultrabook, a portable media device (e.g., an MP3 player), a gaming console, a portable gaming device, a set top box, microconsole, a digital media player, and the like, or even a wearable device such as a smart watch.

As depicted in FIG. 3, the user endpoint device 300 comprises a hardware processor element 302 (e.g., a central processing unit (CPU), a microprocessor, or a multi-core processor), a memory 304, e.g., random access memory (RAM) and/or read only memory (ROM), a module 305 for enhancing digital entertainment media with contextually relevant supplemental content, and various input/output devices 306 (e.g., storage devices, including but not limited to, a tape drive, a floppy drive, a hard disk drive or a compact disk drive, a receiver, a transmitter, a speaker, a display, a speech synthesizer, a network interface card (NIC), an output port, an input port, and a user input device (such as a keyboard, a keypad, a mouse, a microphone and the like)). Although only one processor element is shown, it should be noted that the user endpoint device 300 may employ a plurality of processor elements. Furthermore, although only one user endpoint device 300 is shown in the figure, if the methods as discussed below are implemented in a distributed manner for a particular illustrative example, i.e., the steps of the below methods or the entire methods are implemented across multiple user endpoint devices, then the user endpoint device 300 of this figure is intended to represent each of those multiple user endpoint devices.

It should be noted that the present disclosure can be implemented in software and/or in a combination of software and hardware, e.g., using application specific integrated circuits (ASIC), a general purpose computer or any other hardware equivalents, e.g., computer readable instructions pertaining to the respective systems and/or methods discussed below can be used to configure a hardware processor to perform the steps functions and/or operations of the systems and methods disclosed herein. In one example, instructions and data for the present module or process 305 for enhancing digital entertainment media with contextually relevant supplemental content (e.g., a software program comprising computer-executable instructions) can be loaded into memory 304 and executed by hardware processor element 302 to implement the steps, functions or operations as discussed herein in connection with the disclosed systems and methods. For instance, the module 305 may include a plurality of programming code components, including a synchronizer component 308, a speech recognizer component 310, a text parser component 312, an identifier component 314, and a formatter component 316.

The synchronizer component 308 may be configured to identify a digital entertainment media that is currently playing and to synchronize operations of the module 305 with the identified entertainment media, e.g., in a manner similar to the synchronizer 202 discussed with reference to FIG. 2.

The speech recognizer component 310 may be configured to recognize words contained in an audio signal associated with the digital entertainment media, e.g., in a manner similar to the speech recognizer 204 discussed with reference to FIG. 2.

The text parser component 312 may be configured to parse a text transcription, closed captioning file, or subtitle file in order to detect names (e.g., of characters, objects, or locations) occurring therein, e.g., in a manner similar to the text parser 206 discussed with reference to FIG. 2.

The identifier component 314 may be configured to cross reference detected names with information about the entertainment media, which may be contained in a database such as the DB 106, in order to detect related data. Thus, the identifier component 314 may operate in a manner similar to the identifier 208 discussed with reference to FIG. 2.

The formatter component 316 may be configured to format the related data into supplemental content for delivery to the user, e.g., in a manner similar to the content formatter 210 discussed with reference to FIG. 2. In this case, the user preferences regarding formatting may be stored locally on the user endpoint device 300 (e.g., in the memory 304) rather than in a remote database.

The processor executing the computer readable or software instructions relating to the below described methods can be perceived as a programmed processor or a specialized processor. As such, the present module 305 for enhancing digital entertainment media with contextually relevant supplemental content (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server. In addition, it should be noted that the hardware processor 302 can be configured or programmed to cause other devices to perform one or more operations as discussed above. In other words, the hardware processor 302 may serve the function of a central controller directing other devices to perform the one or more operations as discussed below.

Thus, the disclosed methods for enhancing digital media with supplemental contextually relevant content may be performed by a user endpoint device communicating with a remote application server that performs most or all of the processing (and which, in turn, accesses a remote database). Alternatively, most or all of the processing may be performed locally by the user endpoint device, which has direct access to the remote database. In further examples, each of the user endpoint device and the application server may perform specific portions of the processing (e.g., one could perform recognition and database cross referencing, while the other formats the supplemental content). Division of processing responsibilities may depend on the processing power of the user endpoint device 300. For instance, if the processing capabilities of the user endpoint device 300 are relatively powerful, then the user endpoint device 300 may be able to perform the methods disclosed herein without assistance from the application server. However, if the user endpoint device's processing capabilities are limited, then the application server may perform the bulk of the processing.

Figure 4:
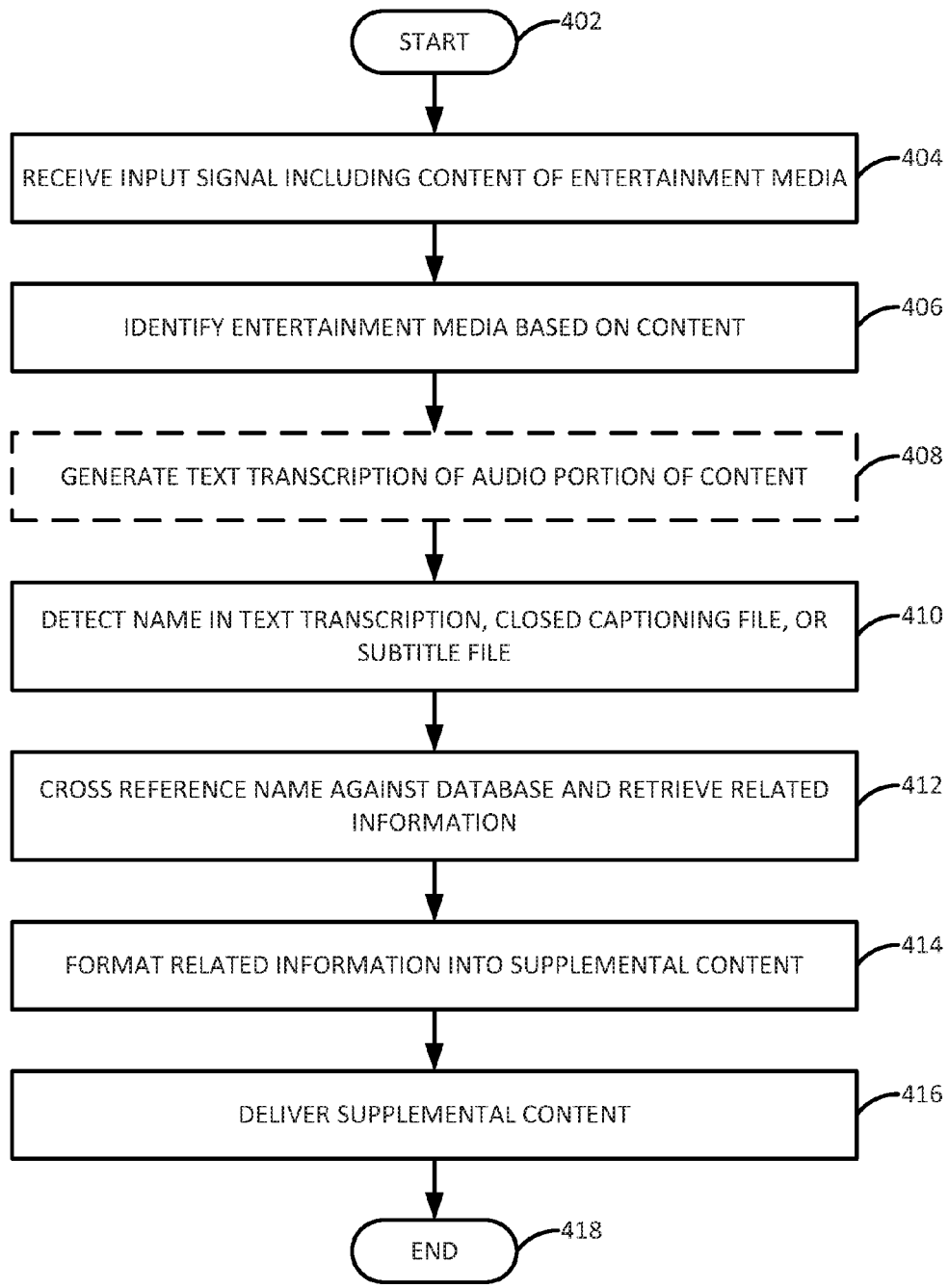
FIG. 4 is a flow diagram illustrating an example of a method for enhancing entertainment media with supplemental contextually relevant content, according to the present disclosure.

FIG. 4 is a flow diagram illustrating an example of a method 400 for enhancing entertainment media with supplemental contextually relevant content, according to the present disclosure. The method 400 may be performed, for example, by the application server 200 illustrated in FIG. 2. Alternatively, the method could be performed by the user endpoint device 300 of FIG. 3. As such, reference is made in the discussion of the method 400 to various components of the application server 200 and user endpoint device 300. However, the method 400 could also be performed by a system that is configured in a different manner. For instance, certain steps of the method 400 could be performed by distributed components, some of which may be located on one or more application servers or user endpoint devices. Thus, the references to the components of the application server 200 and user endpoint device 300 in the following discussion are not intended to be limiting.

The method 400 begins in step 402. In step 404, the application server 200 or user endpoint device 300 receives an input signal from a user. Where the method 400 is performed by the application server 200, the input signal may be an electronic signal received over a content distribution network (e.g., core network 102 and/or access network 120 of FIG. 1) from a user endpoint device, such as one of the UEs 108, 110, 112, or 114 illustrated in FIG. 1. Where the method 400 is performed by the user endpoint device 300, the input signal may be an electronic signal received directly from the user without traversing a network (or traversing only a local network, e.g., via a verbal command, button press, or remote control command issued to the user endpoint device 300).

In one example, the input signal includes content of an entertainment media. The entertainment media may be an episode of a television show, a film, an episode of a web series, an episode of a podcast, an audiobook, an electronic book, or the like. Thus, the input signal may include an audio signal recorded from a broadcast of the entertainment media, a closed captioning or subtitle file associated with the entertainment media, or other data that is obtainable directly from the entertainment media. In the case where the input signal includes content of an entertainment media, the user endpoint device from or by which the input signal is received may or may not be the same user endpoint device on which the entertainment media is playing. For instance, if the entertainment media is an episode of a television show playing on a smart television, the input signal may be received directly from or by the smart television. However, the input signal may also be received from or by a smart phone, a tablet computer, a set top box, a microconsole, a digital media player, or other device that records or otherwise retrieves content from the television. In another example, the input signal may include an indication from a user of the user endpoint device that identifies the entertainment media (e.g., by show title, episode title or number, or the like).

In step 406, the synchronizer 202 of the application server 200 or the synchronizer component 308 of the user endpoint device 300 identifies the entertainment media based on the input signal and optionally synchronizes itself with the entertainment media. For instance, once the entertainment media is identified, the synchronizer 202 or synchronizer component 308 may retrieve a script, a closed captioning file, a subtitle file, or the like for the entertainment media and use the script, closed captioning file, or subtitle file to "follow along" with the entertainment media from a given time point as it plays on a user endpoint device.

In optional step 408 (illustrated in phantom), the speech recognizer 204 of the application server 200 or the speech recognizer component 310 of the user endpoint device 300 performs one or more speech recognition techniques (e.g., automatic speech recognition, natural language processing, or the like) on an audio signal contained in the input signal, in order to recognize the words contained in the audio signal. Step 408 is optional because the input signal may or may not contain an audio signal. For instance, in one example, a user who is playing the entertainment media on a first user endpoint device (e.g., a television) may use a second, different user endpoint device (e.g., a smart phone) to record a portion of the entertainment media from the first user endpoint device and to send this portion of the entertainment media in the input signal.

In step 410, the text parser 206 of the application server 200 or the text parser component 312 of the user endpoint device 300 parses a text file in order to detect a name occurring in the text file. The text file may comprise dialogue corresponding to the media (e.g., where the term "dialogue" is used loosely to refer to narrative speech as well as character lines). In one example, where the input signal contained an audio signal that is processed by the speech recognizer 204 or speech recognizer component 310 (e.g., in step 408), the text file may be a speech-to-text transcription of the audio file. In another example, the text file may be a closed captioning file or a subtitle file contained in the input signal. In one example, the text parser 206 or text parser component 312 may simply search the text file for proper names. In a further example, the search may be narrowed to specific proper names based on metadata related to the entertainment media. For instance, once the synchronizer 202 or synchronizer component 308 has identified the entertainment media (e.g., in step 406), the text parser 206 or text parser component 312 may be able to retrieve (e.g., from a database such as the DB 106) a list of character, object, and location names associated with the entertainment media. Thus, the search could be limited to names appearing in this list.

In step 412, the identifier 208 of the application server 200 or the identifier component 314 of the user endpoint device 300 cross references the names detected in step 410 with information about the entertainment media that is contained in a database (e.g., DB 106). For instance, the identifier 208 or identifier component 314 may compare a detected name of a person against a cast listing or episode summary for the entertainment media, in order to determine that the detected name belongs to a particular character. Step 412 may also include retrieving information related to the detected name from the database. For instance, if the detected name belongs to a character, the retrieved information may include an image of the character, the character's relationships to other characters, or a description of the character's role in the entertainment media, among other information.

Figure 5A:
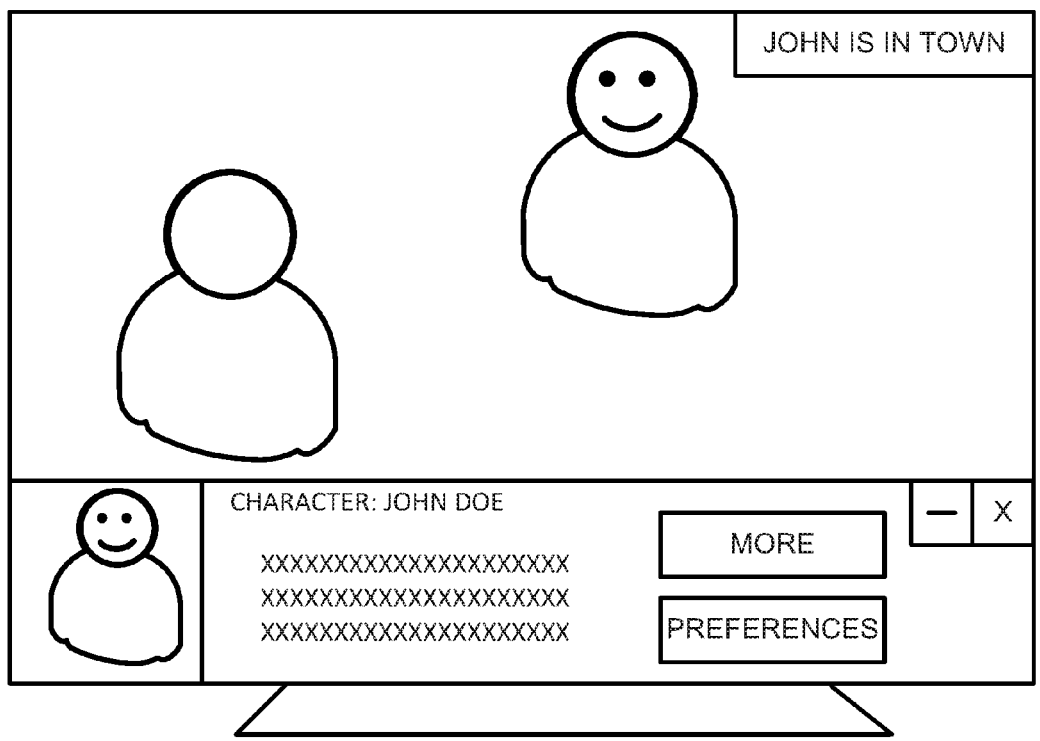
FIG. 5A illustrates an example of supplemental content that is formatted as a graphic overlay for a television or other display device.
Figure 5B:
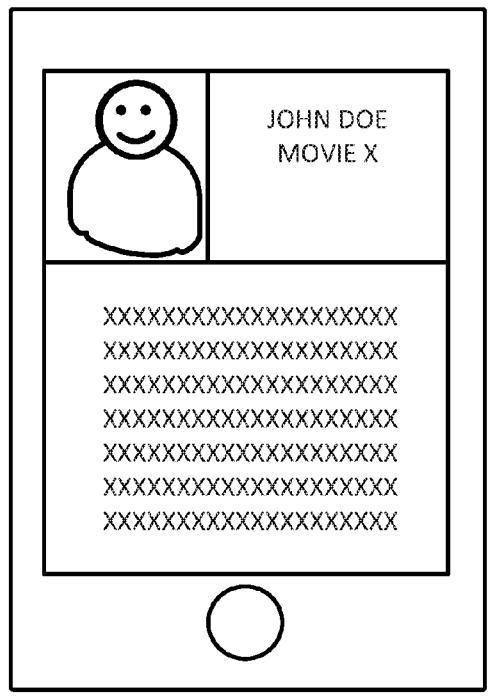
FIG. 5B illustrates an example of supplemental content that is formatted for display on a separate mobile device.

In step 414, the content formatter 210 of the application server 200 or the content formatter component 316 of the user endpoint device 300 formats the data retrieved in step 412 into supplemental content for delivery to the user. For instance, the content formatter may format images, text, or other data about the character, object, or location into a form that is suitable for viewing, listening, or other playback on a particular user endpoint device. In one example, the format of the supplemental content may be designed to satisfy one or more preferences of a user of the user endpoint device. These preferences may be retrieved, for example, from a database (e.g., DB 106). For instance, the supplemental content may be formatted as a graphic overlay that can be superimposed directly over the entertainment media on a viewing device (e.g., a television). FIG. 5A, for instance, illustrates an example of supplemental content that is formatted as a graphic overlay for a television or other display device 500. Alternatively, the supplemental content may be formatted as a file that can be viewed separately on a mobile device with a small display. FIG. 5B, for instance, illustrates an example of supplemental content that is formatted for display on a separate mobile device 502. In another example, the format of the supplemental content may be limited by the form of the digital entertainment media. For instance, if the digital entertainment media is an audiobook, then the file format of FIG. 5B may be a more appropriate means of delivering the supplemental content than the graphic overlay of FIG. 5A.

In step 416, the application server 200 or the user endpoint device 300 delivers the supplemental content. Where the method 400 is performed by the application server 200, delivery of the supplemental content may include sending the supplemental content over a content distribution network to one or more user endpoint devices, such as one or more of the UEs 108, 110, 112, or 114 illustrated in FIG. 1. The determination of which user endpoint device to which to deliver the supplemental content may be made in accordance with user preferences (e.g., a user may request that supplemental content be delivered directly to a television as a graphic overlay, or directly to a smart phone or electronic mail account as a separately viewable file). Delivery of the supplemental content may involve pushing the supplemental content to the user endpoint device(s) by the application server 200, or pulling of the supplemental content from the application server 200 by the user endpoint device(s). Where the method 400 is performed by the user endpoint device 300, delivery of the supplemental content may include displaying the supplemental content on an integrated display or otherwise outputting the supplemental content via an integrated output device.

Delivery of the supplemental content may further include delivery of a hyperlink via which the supplemental content can be accessed (e.g., by launching the hyperlink in a web browser on a networked user endpoint device), or delivery of an alert instructing the user to log into an account to view the supplemental content.

The method 400 ends in step 418.

Thus, the method 400 is able to deliver contextually relevant supplemental content to a user in a timely manner (e.g., as an entertainment media is playing). For instance, if the input signal contains an audio recording of the entertainment media, the supplemental content could be delivered in a matter of seconds to a user endpoint device (e.g., supplemental content related to a given character could be delivered within seconds of the character appearing or being mentioned in the entertainment media). In examples where the input signal contains a script, a closed captioning file, or a subtitle file, the supplemental content could even be fetched and formatted ahead of time, so that the perceived latency of the method 400 (e.g., as a result of network latency or other factors) is minimized.

Moreover, examples of the method 400 could be performed automatically. For instance, the method 400 could continuously "listen" for input signals (e.g., via a microphone in a networked user endpoint device) and generate contextually relevant supplemental content as the input signals are obtained, without being prompted. Certain optimizations can be made to determine when and how to display the supplemental content (e.g., based on user preferences, knowledge of the entertainment media's timing and breaks, if any, a time since supplemental content was last displayed, knowledge of when a referenced character, object, or location was last referenced. etc.). In other examples, the method 400 is user triggered (e.g., performed in response to explicit user signals requesting supplemental content). For instance, the user may utter a verbal command that is detected by a microphone (e.g., "Who is John?") or may use a pointing device (e.g., a mouse) to select a particular character or name on a display.

Although examples of the disclosure are discussed within the context of digital entertainment media, the disclosed examples may be equally applicable to certain non-digital forms of media, as well as to media that does not strictly qualify as entertainment media (e.g., media that is more educational or business-related in nature). For instance, examples of the present disclosure could be adapted to include a recognizer or recognition component that can perform facial recognition or other types of image processing in order to recognize characters, objects, or places in a photograph or screen capture image.

The flowchart and block diagrams in the Figures illustrate the architecture, functionality, and operation of possible implementations of systems and methods according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

Examples of the present disclosure may be a system, a computer-implemented method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    detecting a proper name occurring in a component of a media playing on a first user endpoint device, wherein the component is contained within an electronic signal and contains dialogue corresponding to the media;
    identifying a character appearing in the media whose name matches the proper name;
    retrieving stored data that is contextually related to the character and the media; and
    formatting the data as supplemental content for display to a user of the first user endpoint device.

2. The computer-implemented method of claim 1, wherein the detecting comprises:
    parsing a text file corresponding to the dialogue for the proper name.

3. The computer-implemented method of claim 2, wherein the component is an audio component.

4. The computer-implemented method of claim 3, further comprising:
    converting the audio component to a text transcription prior to the parsing, wherein the converting is performed by a same device that performs the parsing, the detecting, the identifying, the retrieving, and the formatting.

5. The computer-implemented method of claim 2, wherein the component is a subtitle file.

6. The computer-implemented method of claim 2, wherein the component is a closed captioning file.

7. The computer-implemented method of claim 1, wherein the identifying comprises:
    cross referencing the proper name against a database containing information about the media.

8. The computer-implemented method of claim 1, wherein the formatting comprises:
    arranging the data as an overlay image to superimpose over the media on the first user endpoint device.

9. The computer-implemented method of claim 1, wherein the formatting comprises:
    arranging the data as a file that is formatted to display on a second user endpoint device that is different from the first user endpoint device.

10. The computer-implemented method of claim 9, further comprising:
    delivering a hyperlink to the second user endpoint device, wherein the hyperlink, when launched on the second user endpoint device, will display the file.

11. The computer-implemented method of claim 9, where the computer-implemented method is performed by the second user endpoint device.

12. The computer-implemented method of claim 1, where the computer-implemented method is performed by the first user endpoint device.

13. The computer-implemented method of claim 1, where the supplemental content is formatted according to a user preference.

14. The computer-implemented method of claim 1, wherein the method is performed at a point in time before the proper name occurs in the media playing on the first user endpoint device.

15. The computer-implemented method of claim 1, wherein the dialogue comprises narrative speech and character lines.

16. A computer-readable storage medium encoded with instructions executable by a processor, wherein the instructions comprise:
    instructions to detect a proper name occurring in a component of a media playing on a first user endpoint device, wherein the component is contained within an electronic signal and contains dialogue corresponding to the media;
    instructions to identify a location appearing in the media whose name matches the proper name;
    instructions to retrieve stored data that is contextually related to the location and the media; and
    instructions to format the data as supplemental content for display to a user of the first user endpoint device.

17. An apparatus, comprising:
    a hardware processor element; and
    a plurality of programming code components that, when executed by the hardware processor element, cause the hardware processor element to perform operations comprising:
        detecting a proper name occurring in a component of a media playing on a first user endpoint device, wherein the component is contained within an electronic signal and contains dialogue corresponding to the media;
        identifying a character appearing in the media whose name matches the proper name;
        retrieving stored data that is contextually related to the character and the media; and
        formatting the data as supplemental content for display to a user of the first user endpoint device.

18. The apparatus of claim 17, wherein the apparatus is the first user endpoint device.

19. The apparatus of claim 17, wherein the apparatus is a second user endpoint device different from the first user endpoint device.

20. A computer-implemented method, comprising:
   obtaining, by a processor, an electronic signal containing an audio component recorded from a media playing on a first user endpoint device;
   identifying, by the processor, the media without assistance from a viewer of the media;
   generating, by the processor, a text transcription of the audio component of the media;
   detecting, by the processor, a name in the text transcription;
   identifying, by the processor, an entity in the media that is associated with the name;
   retrieving, by the processor, stored data that is contextually related to the entity; and
   formatting, by the processor, the data as supplemental content for display to a user of the first user endpoint device.

21. The computer-implemented method of claim 20, wherein the computer-implemented method is performed by the first user endpoint device.

22. The computer-implemented method of claim 20, wherein the computer-implemented method is performed by a second user endpoint device different from the first user endpoint device.

23. A computer-implemented method, comprising:
   obtaining, by a processor, an electronic signal containing a text file corresponding to dialogue from a media playing on a first user endpoint device;
   identifying, by the processor, the media and a point in time in the media that is currently playing, based on information contained in the electronic signal;
   synchronizing, by the processor, operations of the processor with play of the media, based on identification of the point in time, where the operations include;
   detecting, by the processor, a name in the text file;
   identifying, by the processor, an entity in the media that is associated with the name;
   retrieving, by the processor, stored data that is contextually related to the entity; and
   formatting, by the processor, the data as supplemental content for display to a user of the first user endpoint device.

24. The computer-implemented method of claim 23, wherein the text file is a closed captioning file.

25. The computer-implemented method of claim 23, wherein the text file is a subtitle file.

* * * * *